US012645665B1

(12) United States Patent
Muschett et al.

(10) Patent No.: US 12,645,665 B1
(45) Date of Patent: Jun. 2, 2026

(54) AUTOMATIC DETECTION AND REMEDIATION OF CONTRADICTORY NATURAL LANGUAGE CONTENT IN INFORMATION SYSTEMS

(71) Applicant: Florida Power & Light Company, Juno Beach, FL (US)

(72) Inventors: Brien H. Muschett, Palm Beach Gardens, FL (US); Marcus J. Balk, Palm Beach Gardens, FL (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 19/179,414

(22) Filed: Apr. 15, 2025

(51) Int. Cl.
 *G06F 16/23* (2019.01)
 *G06F 16/242* (2019.01)

(52) U.S. Cl.
 CPC ........ *G06F 16/2365* (2019.01); *G06F 16/243* (2019.01)

(58) Field of Classification Search
 CPC ............................ G06F 16/2365; G06F 16/243
 USPC ........................................................ 707/691
 See application file for complete search history.

(56) References Cited

U.S. PATENT DOCUMENTS

| | | | |
|---|---|---|---|
| 11,151,177 B2 | 10/2021 | Li et al. | |
| 11,461,664 B2 | 10/2022 | Neumann | |
| 11,581,094 B2 | 2/2023 | Neumann | |

| | | | |
|---|---|---|---|
| 11,593,631 B2 | 2/2023 | Dalli et al. | |
| 11,594,054 B2 | 2/2023 | Walters et al. | |
| 11,663,266 B2 | 5/2023 | Mosseri et al. | |

(Continued)

FOREIGN PATENT DOCUMENTS

| | | |
|---|---|---|
| AU | 2024227484 | 11/2024 |
| WO | 2022060061 | 3/2022 |

(Continued)

OTHER PUBLICATIONS

Sarda, Komal, et al., "Leveraging Large Language Models for the Auto-remediation of Microservice Applications: An Experimental Study", FSE Companion '24, Porto de Galinhas, Brazil, Jul. 15-19, 2024, pp. 358-375.*

(Continued)

*Primary Examiner* — Robert Stevens
(74) *Attorney, Agent, or Firm* — TROUTMAN PEPPER LOCKE LLP; Dustin B. Weeks; Bo Yang

(57) ABSTRACT

A system and method for creating a remediation plan with in-context learning (ICL) to a large language model (LLM) involves accessing pieces of content from a corpora and calculating similarity scores between selected content and the corpora. If the similarity score exceeds a set threshold, static metadata—such as authorship, file name, file size, last updated date, or source location—is retrieved. Dynamic metadata, including word count, sentence count, grammar correctness, number of citations, or layout classification, is also generated. Based on static and dynamic metadata, a remediation action is determined, which may involve merging content, prioritizing one piece over another, or ignoring certain content. A remediation prompt is then created and sent to the LLM to generate a preferred output. The process continues by accessing additional unprocessed content and repeating until a time limit expires, computational resources are consumed, or all content has been processed.

20 Claims, 4 Drawing Sheets

(56) References Cited

U.S. PATENT DOCUMENTS

| | | | |
|---|---|---|---|
| 11,763,235 | B1 | 9/2023 | Penfield et al. |
| 11,775,758 | B2 | 10/2023 | He et al. |
| 11,861,320 | B1 | 1/2024 | Gajek et al. |
| 12,093,374 | B1 * | 9/2024 | Schindel ............... G06F 21/552 |
| 12,175,187 | B2 | 12/2024 | Galitsky |
| 12,210,839 | B1 * | 1/2025 | Burton ................... G06F 40/30 |
| 12,380,287 | B2 * | 8/2025 | Gardner ............... G06F 16/345 |
| 2006/0161635 | A1 * | 7/2006 | Lamkin .................. G06F 16/16 |
| | | | 709/217 |
| 2017/0213127 | A1 | 7/2017 | Duncan |
| 2021/0124876 | A1 | 4/2021 | Kryscinski et al. |
| 2021/0374569 | A1 | 12/2021 | Jezewski |
| 2022/0030009 | A1 | 1/2022 | Hasan |
| 2022/0245354 | A1 | 8/2022 | Mackay et al. |
| 2023/0042051 | A1 | 2/2023 | Clement et al. |
| 2024/0028838 | A1 | 1/2024 | Compton et al. |
| 2024/0070403 | A1 | 2/2024 | Meng et al. |
| 2024/0144049 | A1 | 5/2024 | Cheng et al. |
| 2025/0190454 | A1 * | 6/2025 | Patil ................... G06F 16/3326 |
| 2025/0284721 | A1 * | 9/2025 | Agrawal ............. G06F 16/3329 |
| 2025/0371317 | A1 * | 12/2025 | Thompson, III ....... G06N 3/006 |

FOREIGN PATENT DOCUMENTS

| | | |
|---|---|---|
| WO | 2024163482 | 8/2024 |
| WO | 2024235429 | 11/2024 |

OTHER PUBLICATIONS

Demartini et al. "Human-in-the-loop Artificial Intelligence for Fighting Online Misinformation: Challenges and Opportunities." IEEE Data Eng. Bull. 43.3 (2020): 65-74.

Gong et al. "Integrating Social Explanations Into Explainable Artificial Intelligence (XAI) for Combating Misinformation: Vision and Challenges." IEEE Transactions on Computational Social Systems (2024), 22 pages.

Guo et al. "A Novel Conflict Deduction Algorithm Based on Contradiction Separation Inference Rule." International Journal of Computational Intelligence Systems 18.1 (2025): 1-15.

Mao et al. "A contradiction solving method for complex product conceptual design based on deep learning and technological evolution patterns." Advanced Engineering Informatics 55 (2023): 101825, 10 pages.

* cited by examiner

AUTOMATIC DETECTION AND REMEDIATION OF CONTRADICTORY NATURAL LANGUAGE CONTENT IN INFORMATION SYSTEMS

FIELD OF THE DISCLOSURE

The present disclosure generally relates to computer-implemented generative artificial intelligence (AI) systems and, more particularly to the detection and remediation of contradictory content when using large language models (LLMs).

BACKGROUND

AI and LLMs provide significant benefits for a diverse range of AI tasks, including those involving real-time human-computer interaction. Enterprise AI applications rely heavily on enterprise data, often stored in office documents, PDFs, plain text files, multimedia content and similar formats. However, many document repositories are poorly curated, frequently containing outdated or conflicting information. For instance, one document might state that Microsoft Azure® is the preferred cloud service provider at Company A, while another claims it is Amazon Web Services®. Similarly, conflicting information may arise regarding HR system downtime, with one source listing the period as Saturday, Jun. 4, 2024, through Sunday, Jun. 5, 2024, while another specifies Friday, Jun. 3, 2024 (starting at 9 PM), through Saturday, Jun. 4, 2024.

AI platforms often use Retrieval Augmented Generation (RAG) to train the LLM on enterprise data, a process known as In-Context Learning (ICL). However, the data used for training is typically uncurated and may contain not only grammatical errors but also contradictory statements. These contradictions can arise from issues such as improper version control, overlapping content domains without clear separation of concerns, and duplication of content that is later inconsistently updated. Such inconsistencies pose challenges for both human readers, as well as the development of AI systems like LLMs, which depend on accurate information.

These conflicting data points lead to misinformation being introduced into generative AI applications, resulting in incorrect yet authoritative responses. Once misinformation is produced, it often perpetuates itself by being recorded and re-ingested into the system, further compounding the issue over time. Manually addressing these errors is a labor-intensive process that demands significant time, effort, and specialized expertise. This challenge is exacerbated when subject matter experts (SMEs) or other critical resources are unavailable to resolve these discrepancies effectively.

SUMMARY OF THE INVENTION

One aspect of the current invention is to improve the functionality of computer-based system by using prompt engineering to create a remediation plan that uses ICL with a LLM to improve the output of the LLM. The process begins by accessing pieces of content from a corpora of content. A similarity score is then calculated between the selected content and at least a portion of the corpora. If the similarity score exceeds a set threshold, static metadata related to the content is retrieved. This static metadata includes information such as authorship, file name, file size, last updated date, source location, or a combination thereof. In addition to static metadata, dynamic metadata is created, which includes similarity scores based on various factors such as word count, sentence count, grammar correctness, number of citations, or layout classification. Based on both static and dynamic metadata, a remediation action is selected, which could involve merging the pieces of content, prioritizing one over another, or ignoring certain pieces of content. A remediation prompt is then generated using the selected remediation action and sent to the LLM to produce the preferred output. The process continues by accessing additional unprocessed pieces of content and repeating the steps of calculating similarity, retrieving metadata, selecting remediation actions, and sending prompts to the LLM. This cycle continues until one of the following conditions is met: a predetermined time period elapses, computational resources are consumed, all pieces of content have been processed, or a combination of these conditions occurs. This iterative process ensures that all relevant content is considered and processed, optimizing the LLM's output generation based on the content's similarity and metadata characteristics.

In one example, the system and method can determine if the corpora has changed and reprocess content accordingly. Similarity scoring may utilize a cross-encoder, bi-encoder, or both, with cosine similarity as a potential metric. The system can process both text and multimedia content. Additionally, it can receive user prompts, generate reports detailing remediation prompts, and mark content used in remediation. These capabilities ensure the AI model continuously refines its training by resolving content conflicts and optimizing information integration.

Other features and advantages of the invention will become apparent to those skilled in the art upon review of the following detailed description, claims, and drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
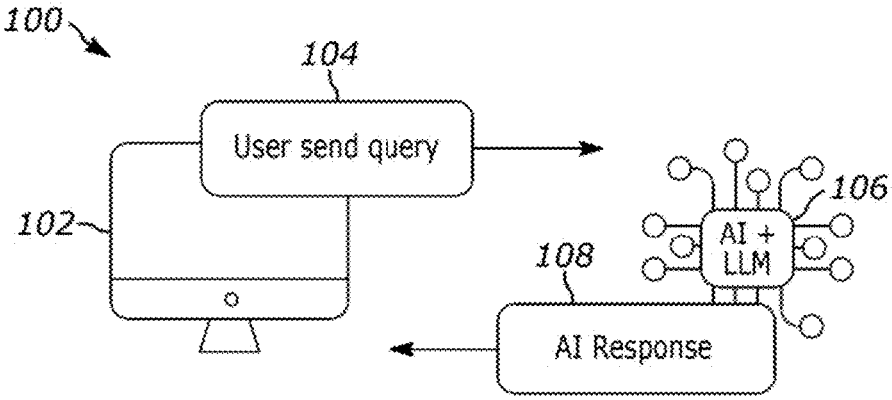
FIG. 1 depicts a high-level example of a client console sending a query to an artificial intelligence (AI) system with a LLM that produces are response, according to the prior art.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

Non-Limiting Definitions

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "completion" or "answer" is the output generated by a language model in response to a prompt.

The term "configured to" describes hardware, software or a combination of hardware and software that is adapted to, set up, arranged, built, composed, constructed, designed, or that has any combination of these characteristics to carry out a given function.

The term "coupled," as used herein, is defined as "connected," although not necessarily directly, and not necessarily mechanically.

The terms "including" and "having," as used herein, are defined as comprising (i.e., open language).

The term "inference" is the process of using a language model to generate text or content based on a given prompt.

The term "large language model" or "LLM" is a technology that uses machine learning models to understand and generate human language text.

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The phrase "pieces of content" is an multimedia content including text, audio, video. The pieces can be an arbitrary size. For example, in the case of text, a piece of content can be a sentence, paragraph or segment of text.

The term "prompt" is a natural language text describing a task that AI should perform. In the case of a LLM, a prompt includes everything needed to communicate a request to perform the task to the LLM. Simply speaking, it is a set of instructions and content for which the LLM should process against in order to perform the task.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

One aspect of the current invention is to improve the functionality of a computer-based system by using prompt engineering to improve the functionality of a computer-based system by generating a remediation plan that uses ICL with a LLM to improve the output of the LLM. The process begins by accessing pieces of content from a corpora and calculating a similarity score between one of the pieces of content against at least a portion of the corpora of content. If the score exceeds a set threshold, the system retrieves static metadata, such as one of authorship, file name, file size, last updated, and source location. The system also generates dynamic metadata, such as word count, sentence count, grammar correctness factor, number of citations, and layout class, with similarity scores for these static and dynamic metadata attributes. Based on this data, a remediation action is selected-merging, prioritizing, or ignoring the content. A remediation prompt is then created using the remediation plan and sent to the LLM to ICL. The method continues iterating through unprocessed content, repeating these steps until a time limit expires, computational resources are exhausted, or all content has been processed. This approach ensures structured learning by resolving content conflicts and optimizing how the LLM integrates information from various sources. The invention remediates conflicts in data sources. Aspects of the invention improve cognitive accuracy, improved knowledge management, enhanced trust, and savings in manual curations.

In generative AI use cases, valuable insights are often embedded within content, such as documents, which can include significant noise and conflicting information from various enterprise sources. This invention offers a solution to identify conflicts and prescribes measures for resolution, eliminating the need for manual intervention by human curators. The present invention saves time and reduces costs.

Unstructured content, such as office documents, is typically ingested into the repository of content using an information retrieval system. During this process, pieces of contents are divided into chunks and vectorized into an index along with supporting metadata.

When a document corpora is ingested into the system, the document information is stored in the static metadata table. This information includes source, author, document name, length, etc. As the document continues to be processed, the information further includes the word count, sentence count, grammar correctness factor, number of citations, and layout class that can be stored as dynamic metadata. Once the corpora ingestion process is complete, a conflict detection process runs with further updates to the dynamic metadata table. The conflict detection uses a similarity analysis by comparing every piece of content to others using a cross-encoder, bi-encoder, or both as part of a Natural Language Understanding (NLU) model. If the similarity exceeds a predefined threshold, pieces of content identified as similar are then flagged for remediation.

One important aspect of this invention is the use of a lightweight cross-encoder model in combination with cosine similarity to detect discrepancies. Specifically, the NLU model determines the degree of similarity between pieces of content or passages text across different documents in a corpora. This technique identifies pieces of content that are similar enough to warrant further analysis, enabling efficient conflict detection and resolution.

After conflict detection is completed, a remediation process is run. The selected remediation plan depends on the severity of the conflict. It is during this process that (using prompt engineering) an LLM is invoked and provided with sentence conflicts and trust heuristics for the pieces of content and rules for remediation. The response from the LLM is the remediated result, which is one of three states: 1) merge, 2) one of the pieces of content, or 3) no piece of content selection. The corpora is then updated to reflect this remediation so that the corpora may be considered "Remediated" and ready for downstream use.

Trust heuristics are generated based on factors such as grammar, conflict severity, citations, and authorship. A remediation action is created by evaluating these trust heuristics to determine the most suitable remediation plan, and all identified contradictions are reported. The heuristics are captured during document processing, and the results are dynamically stored as metadata. The static metadata, e.g., authorship, file name, file size, last updated, source location, etc., are captured during the content inspection phase of the ingestion process. Examples of dynamic metadata include word count, sentence count, grammar correctness factor, number of citations, layout class, etc. The system then flags the conflicts for remediation and leverages a LLM to determine that merging the conflicting content into a single accurate statement is the optimal resolution in many cases.

The remediation process involves integrating static metadata with dynamic metadata and utilizing the LLM for conflict resolution through prompts influenced by this metadata. This structured approach delivers several benefits, including improved cognitive accuracy, enhanced knowledge management, greater trust in data integrity, and significant savings in manual curation efforts.

This ensures that the resolution method is tailored to the specific nature of the conflict, maintaining accuracy and consistency.

In an example, two statements about an organization's proxy settings are detected as similar (underlining denotes differences):

"The proxy settings should be http_proxy=http://myproxy.mycompanydomain.com: 10262; export https_proxy=http://myproxy.mycompanydomain.com: 10262; export no_proxy='.amazonaws.com, .mycompanydomain. com, localhost, 127.0.0.1, .local, 169.254 . . . , 150.109 . . . , .mycompanydomain.com, .inpo.org, .wano.org, *.elb.amazonaws.com" "

"The proxy settings are http://myproxy.mycompanydomain.com:10262; export https_proxy=http://myproxy.mycompanydomain.com: 10262; export no_proxy='.vpce.amazonaws.com, .amazonaws.com, .mycompanydomain.com,localhost, 1 27.0.0.1, .local, 169.254 . . . , 150.109 . . . , .mycompanydomain.com, .inpo.org, .wano.org, ._elb.am azonaws.com" "

The "prompts" guide an AI model, particularly a LLM, towards generating the desired output by providing context, examples, and clear instructions, essentially acting like a "roadmap" to steer the AI towards the intended response, especially conflicts among one or more pieces of content in a corpora of content.

Overview of an AI System

FIG. 1 depicts a high-level example 100 of a client console 102 sending a query 104 to an artificial intelligence (AI) system 108 with a LLM 106 that produces the AI response 108, according to the prior art. The generative AI system provides a response, as shown. Examples of AI systems with LLMs are chatbots such as ChatGPT, Copilot, Bard, and LLAMA, and text-to-image artificial intelligence art systems such as Stable Diffusion, Midjourney, and DALL-E. However, the present invention is not limited to these examples.

Overview of Training LLM

Figure 2:
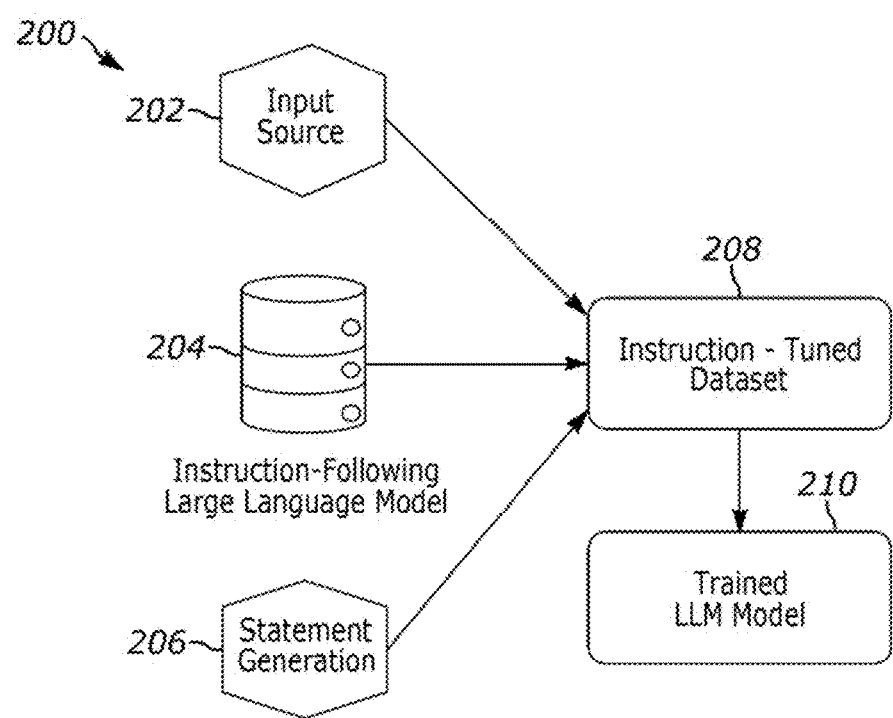
FIG. 2 depicts a high-level example of training a LLM, according to the prior art.

FIG. 2 depicts a high-level example 200 of training a LLM. Training a LLM involves feeding it vast amounts of content from diverse sources, refining its ability to generate coherent and contextually appropriate responses. The input sources 202 for training typically include publicly available datasets, licensed proprietary content, books, articles, research papers, and internet-based corpora. These input sources 202 help the model develop a broad understanding of language, grammar, context, and domain-specific knowledge. Preprocessing these datasets is crucial to filter out biases, inconsistencies, and irrelevant data to improve the model's accuracy and reliability.

An instruction-following LLM 204 is trained to respond to user prompts by understanding natural language instructions and generating structured outputs accordingly. This requires an instruction-tuned dataset 208, which consists of pairs of prompts and desired responses, often curated by experts or derived from human feedback. By exposing the model to various instructions and corresponding responses, it learns to follow commands, generate explanations, summarize content, answer questions, and complete specific tasks while maintaining logical consistency.

The statement generation 206 phase fine-tunes the LLM's ability to produce meaningful and contextually relevant sentences. At this stage, the model leverages its pre-trained knowledge and instruction-based refinements to generate human-like responses that align with the intent of the given input. Reinforcement learning techniques, often combined with human feedback (RLHF), further refine its outputs, ensuring that the model adheres to ethical guidelines, minimizes hallucinations, and improves factual accuracy.

The result of this process is a fully Trained LLM Model 210, capable of interpreting and executing complex instructions across a variety of applications, including content generation, question answering, code completion, and decision support. Continuous monitoring and updates are essential to enhance its capabilities, address biases, and adapt to new knowledge domains. As LLMs evolve, they are increasingly integrated into AI-driven workflows, making them valuable tools in research, automation, and human-AI collaboration.

Trained LLM Can Generate Incorrect or Outdated Responses

A trained LLM can generate incorrect or outdated responses even if it wasn't explicitly trained on incorrect or corpora of content with conflicting information. There are several reasons that the response may not be accurate.

Generalization from Limited Data—Even if the LLM wasn't trained on the specific "conflicted" corpora, it has seen a vast amount of related information. It generalizes patterns from that data, but generalization is not the same as perfect recall. It can make reasonable but incorrect extrapolations based on incomplete patterns.

Training Cutoff and Stale Information—An LLM's training data has a cutoff date. Even if it was never trained on incorrect information, it may still output outdated knowledge simply because it hasn't seen the latest updates.

User Prompts and Context Drift—The way a user asks a question can influence the model's output. If a prompt is ambiguous, the model might fill in gaps based on probabilities, potentially favoring less desirable but still plausible responses.

Reinforcement from Post-Training Data—Some LLMs undergo post-training tuning via human feedback (RLHF). If human reviewers provided feedback that wasn't perfectly aligned with the most current or desirable information, the model could reinforce suboptimal patterns.

Remediating an LLM Trained with Conflicting Information

Figure 3:
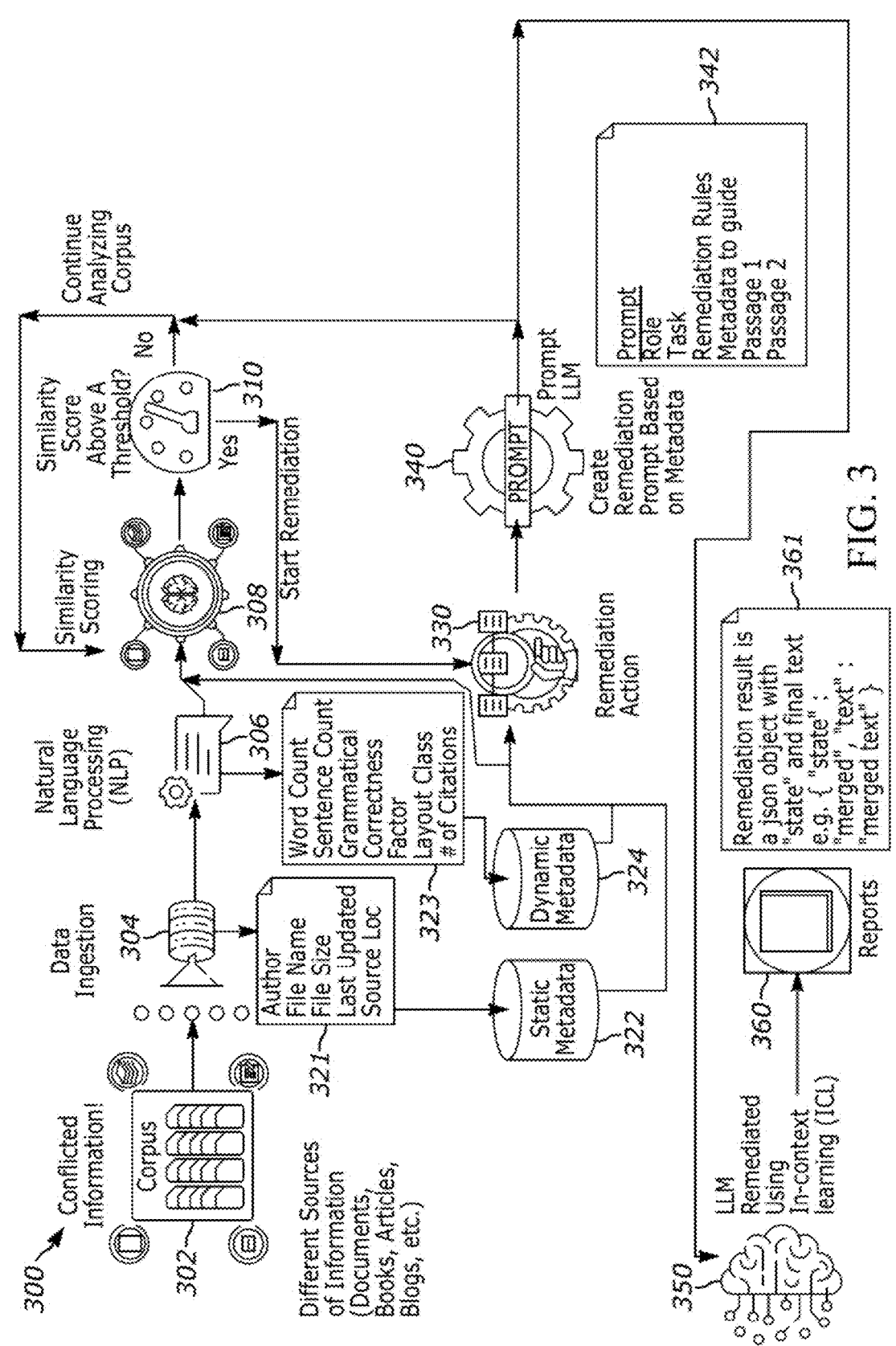
FIG. 3 depicts a high-level example of remediating a LLM using prompt engineering to enhance ICL, according to one aspect of the present invention.

FIG. 3 depicts a high-level example 300 of remediating a LLM using prompt engineering to enhance ICL. A corpora of content with conflicted information 302 from various sources, including documents, books, articles, and blogs is shown. Next, pieces of content from the corpora of content containing conflicted information 302 are accessed. The data ingestion process 304 imports and prepares raw content data from this corpora for use by an NLP system. Data ingestion is important because the quality and structure of the input data directly affect the performance of NLP models. This data ingestion process begins with data collection, where content is gathered from the corpora. The content then undergoes data preprocessing, which involves cleaning and normalizing the content by removing noise such as special characters and stopwords, tokenizing words, and handling missing or incorrect data. After preprocessing, the content is formatted into a structured format suitable for NLP models, such as JSON, CSV, or embeddings. Finally, the processed content is stored and indexed in a manner that allows efficient retrieval for training or inference. The data ingestion process 304 also updates the static metadata 322, more specifically types of static metadata 321, such as the document storage location, the document size, the file format, the file size, the language, the date created, the date modified, the title, the author(s), abstract or summary, etc. This static metadata helps categorize content, identify similarities, and assess potential conflicts within the corpora. The process goes on to the NLP 306.

NLP 306 techniques are applied to the pieces of content to enable computers to understand, interpret, generate, and respond to human language. It combines linguistics, computer science, and machine learning to analyze multimedia content, including text or speech, in a way that mimics human communication. NLP involves several key processes, including tokenization, which breaks content into words or sentences, and part-of-speech tagging, which identifies grammatical components such as nouns, verbs, and adjectives. Named entity recognition (NER) detects specific names of people, places, and organizations, while sentiment analysis determines the emotional tone of the content.

Other important aspects of NLP include syntax and parsing, which analyze grammatical structure, and semantic analysis, which focuses on understanding meaning and context. Machine translation allows for the automatic conversion of content between languages, while content summarization condenses lengthy content into concise summaries. Additionally, NLP powers speech recognition and generation, enabling voice assistants like Siri and Alexa to process spoken commands. The NLP 306 processing step updates the metadata (both static and dynamic). The dynamic metadata 324 is created to calculate similarity scoring 308 for one of word count, sentence count, grammar correctness factor, number of citations, and layout class or a combination thereof. Static metadata 322 and dynamic metadata 324 are used in remediation action 330, which is discussed in further detail below. The process continues to the similarity scoring process 308.

The similarity scoring process 308 is conducted to evaluate the relationships between different pieces of information. The similarity scoring process in one example uses one of a cross-encoder, a bi-encoder, or a combination of both. In another example, the similarity scoring process 308 uses cosine similarity.

Next, a test is made if the similarity score exceeds a predefined threshold 310. A high similarity score indicates significant overlap or conflict between pieces of content. The system initiates a remediation process. If the similarity score is below the threshold, the system continues analyzing the corpora without taking corrective action.

If the similarity score is above the threshold, a remediation action 330 is selected based on the static metadata 322, the dynamic metadata 324 or both. The remediation action 330 includes i) merging pieces of content, ii) prioritizing one of the pieces of content, or iii) ignoring one of the pieces of content.

A remediation prompt 340 is created using the remediation action. Dynamic and, in some examples, static metadata may be used as part of the remediation prompt 340. The remediation prompt 340 is sent to the LLM 350. A remediation prompt 340 is designed to guide the LLM 350 in resolving conflicts identified between the two or more pieces of content, ensuring that it produces an optimized and coherent response that aligns with the most reliable and relevant information available. Typical fields for an example prompt 342 are shown. The LLM then processes the remediation prompt and updates its outputs accordingly. Once remediation is complete, the system resumes analyzing the remaining corpora, continuously improving the consistency and accuracy of the LLM's responses.

This iterative process helps maintain a high-quality knowledge base within the LLM, enabling it to generate more trustworthy, refined, and contextually accurate outputs over time. The integration of similarity scoring, NLP-based metadata extraction, and automated remediation ensures that the model can adapt dynamically while mitigating misinformation and inconsistencies.

Reports 360 are stored so that reports/dashboards can be created to identify the issue and how the ICL resolved it.

In one example, the corpora of content 302 can be remediated using a "write back". This writeback enables that RAG (retrieval augmented generation) to occur later. An example remediation results 361 is shown.

Three Levels of Remediation (Low, Medium, High) In The Remediation Action 330

Remediation approaches based upon conflicted-ness scale-Low (Minor conflict, can be merged), Medium (In conflict but resolved by losing one of the pieces of content), High (severely conflicted, no resolution both pieces of content are dropped)

Low—Minor Conflict—Merge
    S1: Microsoft Azure is our preferred cloud service provider here at Company A.
    S2: Amazon Web Services is our preferred cloud service provider at Company A Metadata Sources
Timestamps
    S1: 23 Jan. 2019
    S2: 24 Feb. 2020
Remediated Result
    S3: As of Feb. 24, 2020, Amazon Web Services is our preferred cloud service provider at Company A; previously, it was Microsoft Azure as of Jan. 23, 2019.

Figure 4:
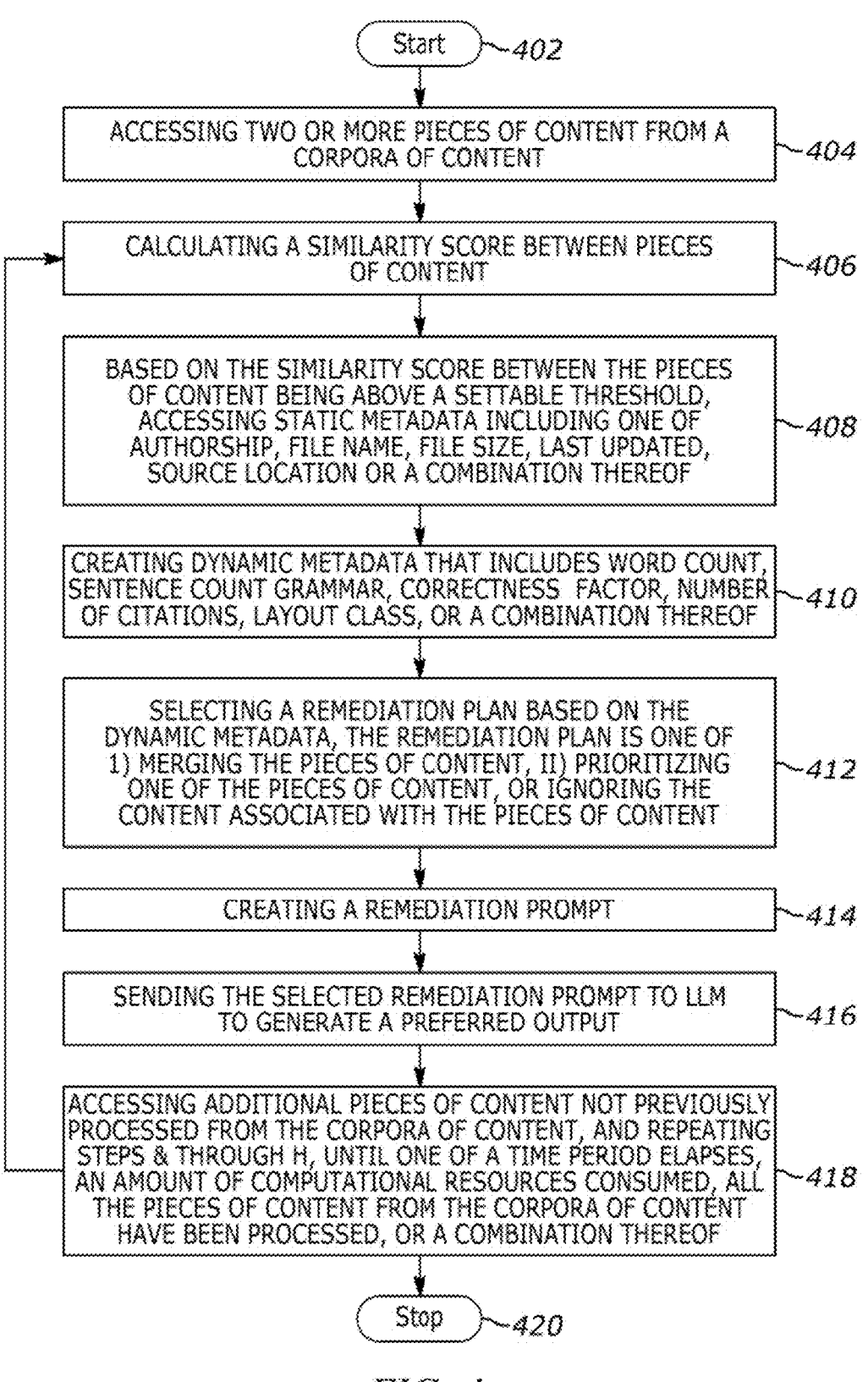
FIG. 4 depicts a flow chart of remediating a LLM using prompt engineering to enhance ICL, according to one aspect of the present invention.
Figure 5:
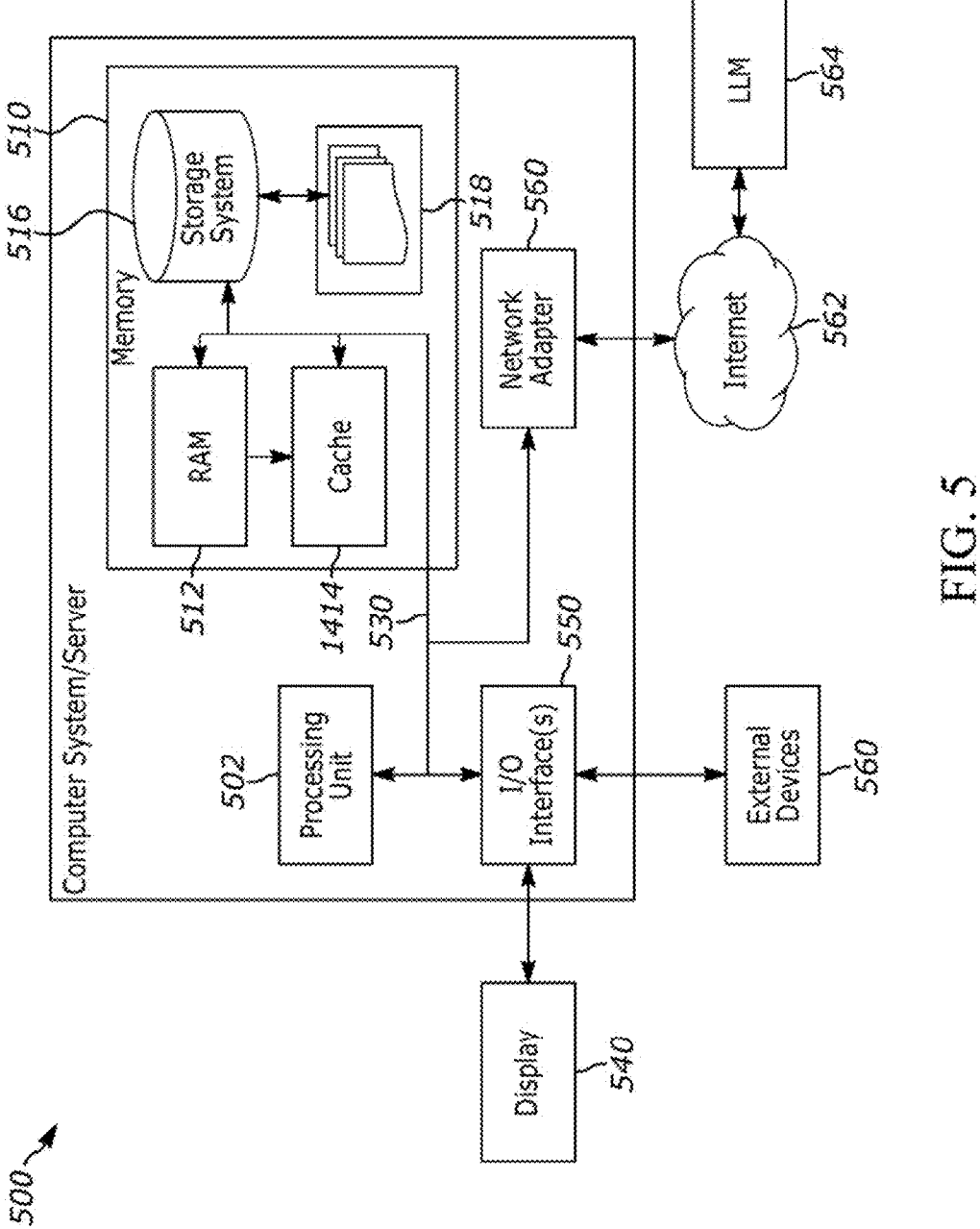
FIG. 5 illustrates an example information processing system for carrying out the aspects of FIG. 3 through FIG. 4 above, according to one aspect of the present invention.

Medium—In Conflict-Drop One
  S1: On premise deployments are supported when there is
    a regulatory requirement.
  S2: NextEra supports on-premise deployments.
Metadata Sources
Priority of Sources (Index 1 Having Higher Priority):
  1. S1
  2. S2
Remediated Result
  S3: On-premise deployments are supported when there is
    a regulatory requirement.
High-Severely Conflicted-Drop Both
  S1: The HR system will be unavailable for the period of
    Saturday, Jun. 4, 2024 through Sunday, Jun. 5, 2024.
  S2: The HR system will be unavailable for the period of
    Friday, Jun. 3, 2024 (starting at 9 PM) through Satur-
    day, Jun. 4, 2024.
Metadata Sources
Priority of Sources (index 1 having higher priority):
  1. S1
  2. S2
Timestamps
  S1: 23 Jan. 2019
  S2: 24 Feb. 2020
Remediated Result
  S3: Removal of both statements
Flow Chart
  FIG. 4 depicts a flow chart of a flow chart of remediating
an LLM using prompt engineering to enhance ICL to
generate a preferred output. The process begins in step 402
and immediately proceeds to step 404.
  In step 404, two or more pieces of content from a corpora
of content are accessed. The process continues to step 406.
  In step 406, a similarity score between pieces of content
is calculated. In one example, as stated above, the similarity
scoring is based on a cross-encoder NLU model, which is a
type of neural architecture used to understand the relation-
ship between two pieces of text, like sentence similarity. The
process continues to step 408.
  In step 408, based on the similarity score between the
pieces of content being above a settable threshold, static
metadata is accessed. The system retrieves static metadata
including authorship, file name, file size, last updated,
source location. The system proceeds to step 410.
  In step 410, dynamic metadata is created that includes
similarity scores for one of word count, sentence count,
grammar correctness factor, number of citations, layout
class authorship, or a combination thereof. The similarity
scores can use the previously calculated similarity score or
generate new similarity scores using other cross-encoder
techniques. The process continues to step 412.
  In step 412, a remediation action is selected based on the
similarity scores of the dynamic metadata, and in some
embodiments, similarity scores of the static metadata may
also be used. The remediation action selected is one of i)
merging the pieces of content, ii) prioritizing one of the
pieces of content, or iii) ignoring or removing one or both of
the pieces of content. The process continues to step 414.
  In step 414, a remediation prompt is created based on the
remediation action selected, and in step 416, this remedia-
tion prompt is sent to the LLM to provide ICL to generate
the preferred output in response to future prompts. The
process continues to step 418.
  In step 418, additional pieces of content are accessed that
were not previously processed from the corpora of content.
Steps 406 to 418 are repeated until one of a time period
elapses, an amount of computational resources are consumed, all the pieces of content from the corpora of content
have been processed, or a combination thereof. This
approach ensures structured learning by resolving content
conflicts and optimizing how the LLM integrates informa-
tion from various sources. The invention remediates con-
flicts in data sources. Aspects of the invention include
improved cognitive accuracy, improved knowledge manage-
ment, enhanced trust, and savings in manual curations.
Information Processing System
  FIG. 5 is a block diagram of an example of an electronic
device 500 that may carry out the embodiments of FIG. 2
through FIG. 4 above. The components can include, but are
not limited to, one or more processors 502 or processing
units, a system memory 510, and a bus 530 that couples
various system components, including the system memory
to the processor.
  The main memory may include algorithms used in under-
standing the relationship between two pieces of content,
including similarity scoring utilizing cross-encoder, bi-en-
coder, or both, reports, and remediation prompts. One or
more of these components can reside within the processor or
be a separate hardware component. The system memory can
also include computer system readable media in the form of
volatile memory, such as random access memory (RAM)
512 and/or cache memory 514. The error auditing and
dispute system can further include other removable/non-
removable, volatile/non-volatile computer system storage
media. By way of example only, a storage system can be
provided for reading from and writing to a non-removable or
removable, non-volatile media such as one or more solid
state disks and/or magnetic media (typically called a "hard
drive") 516. A magnetic disk drive for reading from and
writing to a removable, non-volatile magnetic disk (e.g., a
"floppy disk"), and an optical disk drive for reading from or
writing to a removable, non-volatile optical disk such as a
CD-ROM, DVD-ROM or other optical media can be pro-
vided. In such instances, each can be connected to the bus
530 by one or more I/O interfaces 550. The system memory
510 can include at least one program product having a set of
program modules that are configured to carry out the func-
tions of an embodiment of the present disclosure.
  Embodiments of the present invention may have a set of
program modules may be stored in memory by way of
example, and not limitation, as well as an operating system,
one or more application programs, other program modules,
and program data. Each of the operating systems, one or
more application programs, other program modules, and
program data or some combination thereof, may include an
implementation of a networking environment. Program
modules 518 generally carry out the functions and/or meth-
odologies of embodiments of the present disclosure.
  Embodiments of the present invention can also commu-
nicate with one or more external devices such as a keyboard,
a pointing device, a display 540, etc.; one or more devices
that enable a user to interact with the information processing
system; and/or any devices (e.g., network card, modem, etc.)
that enable computer system/server to communicate with
one or more other computing devices. Such communication
can occur via I/O interfaces 550. Still yet, the information
processing system can communicate with one or more
networks such as a local area network (LAN), a general wide
area network (WAN), and/or a public network (e.g., the
Internet) 562 via network adapter 560 to LLM 564. As
depicted, the network adapter communicates with the other
components of the information processing system via the
bus. Other hardware and/or software components can also be
used in conjunction with the information processing system.

Examples include, but are not limited to, microcode, device drivers, redundant processing units, external disk drive arrays, RAID systems, tape drives, and data archival storage systems.

Non-Limiting Examples

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without the use of other features of the present invention. As such, the foregoing description should be considered as merely illustrative of the principles, teachings, examples, and exemplary embodiments of the present invention and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a remediation plan that uses in-context learning (ICL) with a large language model (LLM) to improve an output of the LLM, the method comprising:
   a) accessing pieces of content from a corpora of content;
   b) calculating a similarity score between the one of the pieces of content against at least a portion of the corpora of content;
   c) based on the similarity score between the pieces of content being above a settable threshold, accessing static metadata related to the pieces of content, the static metadata includes one of authorship, file name, file size, last updated, source location, or a combination thereof;
   d) creating dynamic metadata that includes similarity scores for one of word count, sentence count, grammar correctness factor, number of citations, layout class or a combination thereof;
   e) selecting a remediation action based on one of the static metadata, the dynamic metadata, or both, the remediation action is one of i) merging the pieces of content, ii) prioritizing one of the pieces of content, or iii) ignoring one of the pieces of content;
   f) creating a remediation prompt using the remediation action; and
   g) sending the remediation prompt to the LLM to generate a preferred output.

2. The method of claim 1, further comprising:
   accessing additional pieces of content not previously processed from the corpora of content, and repeating steps b through h, until one of a time period elapses, an amount of computational resources are consumed, all the pieces of content from the corpora of content have been processed, or a combination thereof.

3. The method of claim 1, wherein the calculating the similarity score between the pieces of content includes using one of cross-encoder, a bi-encoder, or combination of both.

4. The method of claim 3, wherein the calculating the similarity score between the pieces of content includes using cosine similarity.

5. The method of claim 1, wherein the remediation prompt includes a role, and each of the pieces of content.

6. The method of claim 1, wherein the pieces of content from the corpora of content are text.

7. The method of claim 1, wherein the pieces of content from the corpora of content are multimedia.

8. The method of claim 1, further comprising:
   determining if the corpora of content has changed; and
   repeating steps a through f based on the determination that the corpora of content has changed.

9. The method of claim 1, further comprising:
   receiving a user prompt; and
   sending the user prompt to the LLM that remediates how the LLM uses the pieces of content.

10. The method of claim 1, further comprising:
   generating a report detailing the remediation prompt.

11. The method of claim 1, further comprising:
   marking the pieces of content from the corpora of content that have been used to create the remediation prompt.

12. A system for generating a remediation plan that uses in-context learning (ICL) with a large language model (LLM) to improve an output of the LLM, the system comprising:
   memory communicatively coupled to a corpora of content;
   at least one processor communicatively coupled to memory, programmed to perform:
   a) accessing pieces of content from the corpora of content;
   b) calculating a similarity score between the pieces of content against at least a portion of the corpora of content;
   c) based on the similarity score between the pieces of content being above a settable threshold, accessing static metadata related to the pieces of content, the static metadata includes one of authorship, file name, file size, last updated, source location, or a combination thereof;
   d) creating dynamic metadata that includes similarity scores for one of word count, sentence count, grammar correctness factor, number of citations, layout class, or a combination thereof;
   e) selecting a remediation action based on one of the static metadata, the dynamic metadata, or both, the remediation action is one of i) merging the pieces of content, ii) prioritizing one of the pieces of content, or iii) ignoring one of the pieces of content;

f) creating a remediation prompt using the remediation action; and g) sending the remediation prompt to the LLM to generate a preferred output.

13. The system of claim 12, further comprising: accessing additional pieces of content not previously processed from the corpora of content, and repeating steps b through h, until one of a time period elapses, an amount of computational resources are consumed, all the pieces of content from the corpora of content have been processed, or a combination thereof.

14. The system of claim 12, wherein the calculating the similarity score between the pieces of content includes using one of cross-encoder, a bi-encoder, or combination of both.

15. The system of claim 14, wherein the calculating the similarity score between the pieces of content includes using cosine similarity.

16. The system of claim 12, wherein the remediation prompt includes a role, and each of the pieces of content.

17. The system of claim 12, wherein the pieces of content from the corpora of content are text.

18. The system of claim 12, wherein the pieces of content from the corpora of content are multimedia.

19. The system of claim 12, further comprising: determining if the corpora of content has changed; and repeating steps a through f based on the corpora of content has changed.

20. The system of claim 12, further comprising: receiving a user prompt; and sending the user prompt to the LLM that remediates how the LLM uses the pieces of content.

\*　\*　\*　\*　\*